Patented Aug. 19, 1941

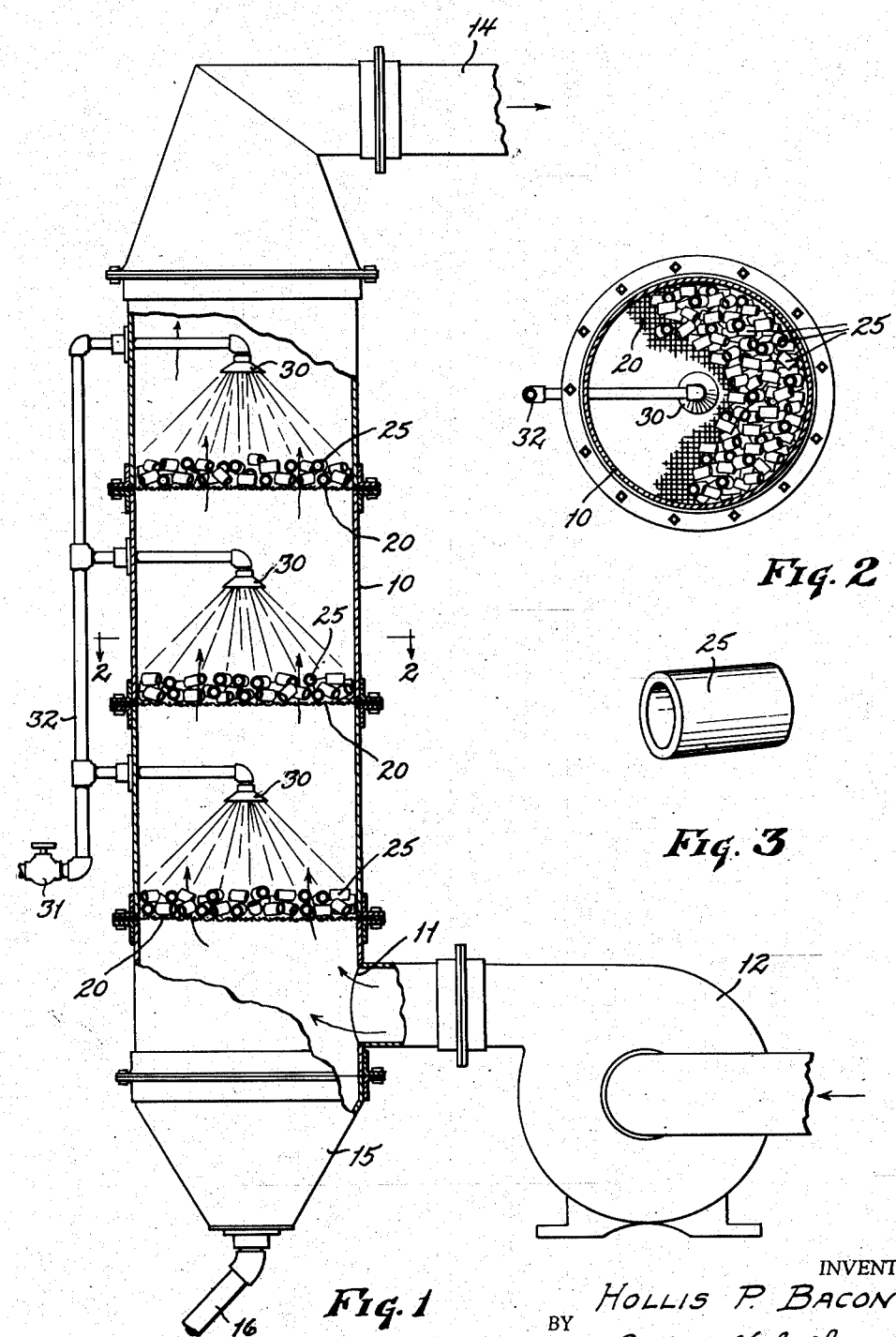

2,253,261

UNITED STATES PATENT OFFICE 2,253,261

DUST COLLECTOR

Hollis P. Bacon, Cleveland Heights, Ohio, assignor to Northern Blower Company, Cleveland, Ohio, a corporation of Ohio Application August 9, 1939, Serial No. 289,191

1 Claim. (Cl. 261—94)

This invention relates to apparatus for removing dust from a current of dust-laden air, and, more particularly, to apparatus for removing dust or moist dust from a current of dust-laden moist air, such as is required for dust removal in manufacturing or processing in establishments where wet processes are used, or where wet or moist materials are used, handled, or processed, as for instance, in foundry shakeout ventilation, or in connection with dryers which are used for heating or drying stone, sand or similar materials.

The efficient removal of dust from dust-laden air or gases presents many difficulties which are well known in the industry. Such difficulties are increased and become more serious when the air, or the dust in the air, has a relatively high moisture content. In the latter instances, the dust collectors now in general use, as for instance, centrifugal types of dust collectors have been found to be inefficient. This inefficiency is believed to be caused partially by the weight of the moisture laden air and the weight of the moisture laden dust carried thereby, and partially because of the tendency moist dust has to adhere to the surfaces of the dust collector or for the tendency of dry or comparatively dry dust to adhere to the surfaces of the dust collector which become moist and even wet from the moisture in the air.

In the past, various types of washers have been tried but with little practical success. Such washers have been inefficient in operation, have required comparatively great surface areas and comparatively large volumes of water or other washing fluid. Likewise, many of the washers used in the past for removing dust have had a tendency to materially impede the progress of the air currents, sometimes to such an extent as to require the use of high pressure blowers to force the dust-laden air through the collector, and even then back pressures have been experienced in apparatus devices such as dryers, with which such collectors have been used.

The general object of the present invention is to provide apparatus for removing dust from dust-laden air in such a manner as to overcome the disadvantages above mentioned.

A further object of this invention is the provision of an improved apparatus for removing dust from dust-laden moist air in an efficient and an economical manner which will require a minimum amount of power to force the dust-laden air through the dust collector without creating back pressures on the apparatus with which it is used and yet maintain the collector relatively small in size.

Other objects and features of the invention will become more apparent from the following description reference being had to the accompanying drawing in which there is illustrated a preferred embodiment of the invention. The essential features will be summarized in the claim.

My improved apparatus for removing dust and dust-laden air comprises structure for forcing a column of dust-laden air past a set of independently movable dust collecting elements which are supported in a confined conduit in a plane extending transversely to the flow of air through the conduit or through a plurality of sets of such elements. These dust collecting elements or obstructions are so arranged, preferably in a contiguous relationship, but sufficient clearance is provided between them to facilitate their moving independently of each other. The weight of these elements is so proportioned relative to the velocity of the moving column of air that such elements will move with respect to each other and present different surface areas to the moving air. While the air is passing the elements, the latter are maintained in a moist condition and the dust collected thereon is washed away by a spray of fluid, such as water, which is caused to flow in a direction opposite to the flow of the current of air.

In the drawing, Fig. 1 is a side elevation, partly in section, of a device embodying my invention; Fig. 2 is a section taken on the line 2—2 in Fig. 1, and Fig. 3 is a perspective view of a dust collecting element.

In the drawing I have more or less diagrammatically shown the preferred form of apparatus. As illustrated in Fig. 1, such apparatus comprises a vertically extending housing or conduit 10 which has an inlet opening 11, adjacent its lower end, through which the dust-laden air is forced by a blower, generally indicated at 12. At its upper end, the housing 10 is provided with an air outlet which may communicate with a suitable conduit 14 for connecting the housing with a stack. The base of the housing 10 is closed by a conical member 15 to the lower end of which is secured a conduit 16 through which the dust collected in the tube, as will be hereinafter more fully described, is carried or washed away by a flow of fluid.

As shown, I have provided the housing 10 with a series of transversely extending vertically spaced screens 20. While in the present arrangement, three screens have been shown, it is contemplated that as many screens will be used as conditions require. Contiguously supported on each screen, as indicated in the drawing, is a plurality of individual movable dust collecting elements 25. In the present form, these elements comprise tubular members and are of such size, shape and weight as to permit them to be independently movable upon their respective screen 20 under the influence of the air being forced through the housing.

In actual use, I have found that porcelain tubes, approximately one inch in diameter, and having a wall of about ⅛ of an inch, and about 1¼ inches in length provide satisfactory elements. Such elements will weigh about three ounces each, and are especially adapted for use in removing foundry dust from a moving column of air, the velocity of which is maintained at about 1000 to 1500 cubic feet per minute.

The dust collected by the elements 25 is removed or washed therefrom by a suitable fluid such as water. Mounted above each screen 20 of the dust collecting elements 25 is a spray nozzle or jet 30 through which a stream of fluid, such as water, is directed downwardly against the elements. The dust thus removed from the elements is carried downwardly by the fluid into the conical base 15 from which it flows as a sludge through the conduit 16. The flow of fluid may be controlled by a suitable valve 31 positioned in the conduit 32 between the source of supply and the sprays or jets 30.

It will be noted that the agitating and partial floatation of the individual dust collecting elements on their respective screens increases and changes the surface area presented to the moving column of air. Moreover, the action on the dust collecting elements of the oppositely moving stream of fluid also materially assists in the agitation of the elements, thus securing a high degree of efficiency and as the dust collecting surface area presented by the agitated elements is many times the cross-sectioned area of the housing 10, the dust collecting apparatus may be maintained relatively small in size.

I claim:

An apparatus for removing dust from a current of air comprising in combination an upright casing having within it and extending across it a plurality of screens spaced apart one above the other, a layer of obstructing devices on each screen, said obstructing devices comprising small hollow ceramic cylinders and the layer consisting of such cylinders arranged indiscriminately with some on top of others but with the layer not more than three cylinders high, means for forcing dust-laden air upwardly through the screens and layers successively at such a force as will lift and roll and turn the cylinders, and means for supplying to the interior of the casing washing liquid passing in a downward direction.

HOLLIS P. BACON.